United States Patent

[11] 3,603,642

[72] Inventor Fritz B. Laessker
Fairport, N.Y.
[21] Appl. No. 865,796
[22] Filed Oct. 13, 1969
[45] Patented Sept. 7, 1971
[73] Assignee Sybron Corporation
Rochester, N.Y.

[54] ARTICULATED HEADREST FOR DENTAL CHAIRS AND THE LIKE
5 Claims, 3 Drawing Figs.

[52] U.S. Cl. ............................ 297/408
[51] Int. Cl. ............................ A47c 1/10
[50] Field of Search ............................ 247/373,
396, 403, 408, 409

[56] References Cited
UNITED STATES PATENTS
3,307,874   3/1967   Wilson ........................ 297/408 X Primary Examiner—James C. Mitchell
Attorney—Theodore B. Roessel ABSTRACT: Disclosed is an articulated headrest for dental chairs in which the mechanism for locking the headrest in position is wholly contained within the headrest. The lock mechanism includes a pair of engageable toothed clutch members, one fixed to the headrest support and one to the headrest, and a lever arm fixed at one end to the latter clutch member and slidably connect at its other end to the headrest. The lever arm permits axial movement of the clutch member fixed to the headrest for disengaging the lock and setting the headrest in the desired position and increases the stability of the headrest.

INVENTOR.
FRITZ B. LAESSKER

ARTICULATED HEADREST FOR DENTAL CHAIRS AND THE LIKE

BACKGROUND OF THE INVENTION

The present invention relates to an articulated headrest for lounge-type dental chairs or the like wherein the headrest forms an extension of the backrest of the chair. More specifically, the invention relates to an articulated headrest wherein two clutch members wholly contained within the headrest are used to support the headrest at any desired forward or backward tilt of the headrest with respect to the backrest of the chair.

One of the more important purposes of a dental chair is to hold the patient's head in proper position for the particular operation performed by the dentist. Several types of headrests, in particular, articulating headrests for supporting the patient's head are known in the art. For example, one type of articulating headrest uses a friction lock to hold the headrest at the desired forward or backward inclination. The friction lock device provides an infinite adjustment possibility but has the disadvantage that some degree of force is required to lock or unlock the mechanism. In another type of headrest, a pawl and ratchet mechanism is used to provide positive engagement and prevent rearward movement of the headrest under the weight of the patient's head. However, such a device does not prevent upward movement of the headrest so that any upward force accidentally applied, would move the headrest out of the desired position.

The new trend in dental equipment is the use of lounge-type chairs wherein the headrest portion forms an extension of the backrest and both the backrest and headrest have a thin profile. Accordingly, a further disadvantage of these prior art articulated headrests when used on lounge-type chairs is that their locking mechanisms were too bulky or cumbersome to fit conveniently within the slim lines of the backrest of the dental chair. An increase in the thickness of the back and headrest to incorporate these bulky devices would destroy the practical advantage of maintaining a slim profile, namely, to permit the dentist to practice that is known as sit-down dentistry wherein the dentist performs his operative procedures while seated with the headrest located adjacent the lap of the dentist. It should be obvious that in such a situation, a relatively thick headrest or protruding lock members would interfere with the proper positioning of the patient.

The present invention overcomes the disadvantages of the prior art by providing an articulated headrest for lounge-type chairs having all the desired adjustments for forward or backward tilt resulting in more comfort to the patient and more efficiency to the dentist. The mechanism for setting and locking the headrest in the desired position is wholly contained within the slim profile of the headrest and securely locks the headrest against both an upward and a downward force for greater patient safety. Disengagement of the lock for repositioning the headrest is accomplished by depressing a pushbutton built into either one or both sides of the headrest portion.

SUMMARY OF THE INVENTION

The present invention can be characterized in one aspect thereof by the provision of a headrest journaled to the backrest of the dental chair; a first toothed clutch member fixed to the backrest coaxial with the headrest journal; second toothed clutch member carried by the headrest in axial alignment with the first clutch member, the second clutch member being moveable axially for engagement and disengagement with the first member; a lever arm having one end fixed to the second clutch member and another end slidably engaged with the headrest for pinning the second clutch member to the headrest; and a biased rod extending axially through the headrest journal and first clutch member and attached to the second clutch member, one end of the rod extending out through the side of the headrest and terminating in a pushbutton, wherein depression of the pushbutton to move the rod against the bias disengages the clutch members for positioning the headrest and release of the pushbutton engages the clutch members for locking the headrest in the desired position.

OBJECTS OF THE INVENTION

One object of the present invention is to provide an articulated headrest for dental chairs and the like having a slim profile wherein the mechanism for locking the headrest in the desired position is wholly contained within the headrest.

Another object of the present invention is to provide an articulated headrest for dental chairs and the like which automatically locks the headrest against both upward and downward pressure.

A further object of the present invention is to provide a locking mechanism for articulated headrests and the like which utilizes toothed clutch members for providing an adjustment in small increments over the range of movement of the articulated headrest.

A still further object of the present invention is to provide a locking mechanism for articulated headrests and the like wholly contained within the headrest which is simply and easily operated by means located at the side of the headrest and which is relatively inexpensive to construct and maintain.

These and other objects, advantages and characterizing features of the present invention will become more apparent upon consideration of the following detailed description thereof when taken in connection with the accompanying drawings.

DESCRIPTION OF THE PREFERRED EMBODIMENTS

Figure 1:
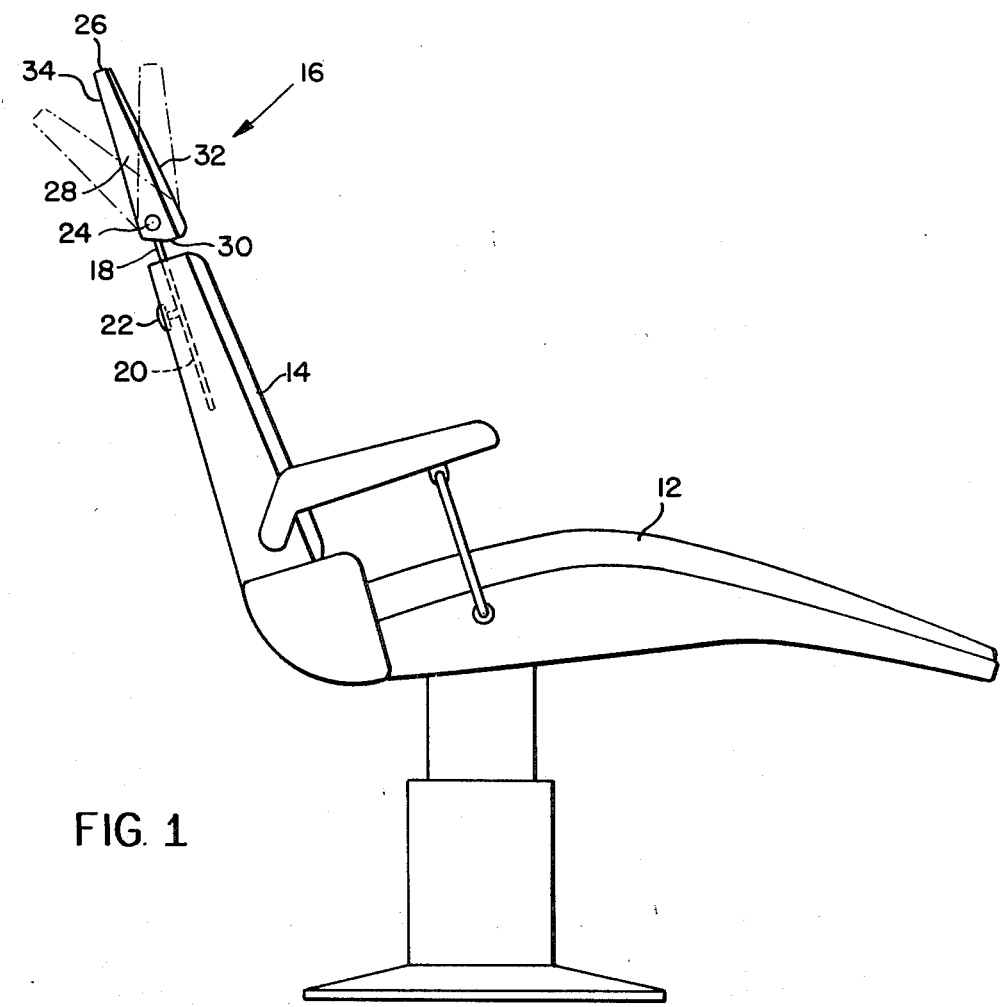
FIG. 1 is a side elevation view of the dental chair employing the headrest of the present invention wherein the phantom line represents the range of motion of the headrest.

Referring to the drawings, FIG. 1 shows a lounge-type dental chair having a seat portion 12 and a backrest portion 14. Attached to the upper portion of backrest 14 is the articulated headrest generally indicated at 16 of the present invention. The headrest is shown detachably attached to backrest 14 by slide member 18 slidably disposed in a corresponding groove 20 extending into the backrest. Slide member 18 is held in this groove by any suitable means such as a hand-turned knob 22 which is turned to frictionally engage slide member 18. Slide member and groove 18 and 20 respectively do not form any part of the present invention and are shown merely for purposes of illustration as being a convenient way of attaching the headrest to the backrest.

Headrest 16 is articulated at 24 in order to permit the headrest to tilt forward and backward with the limit of inclination being shown in phantom in FIG. 1. Preferably, the headrest should tilt approximately 30° backward and 18° forward of the plane of the backrest for an approximate total range of motion of 48°.

Figure 2:
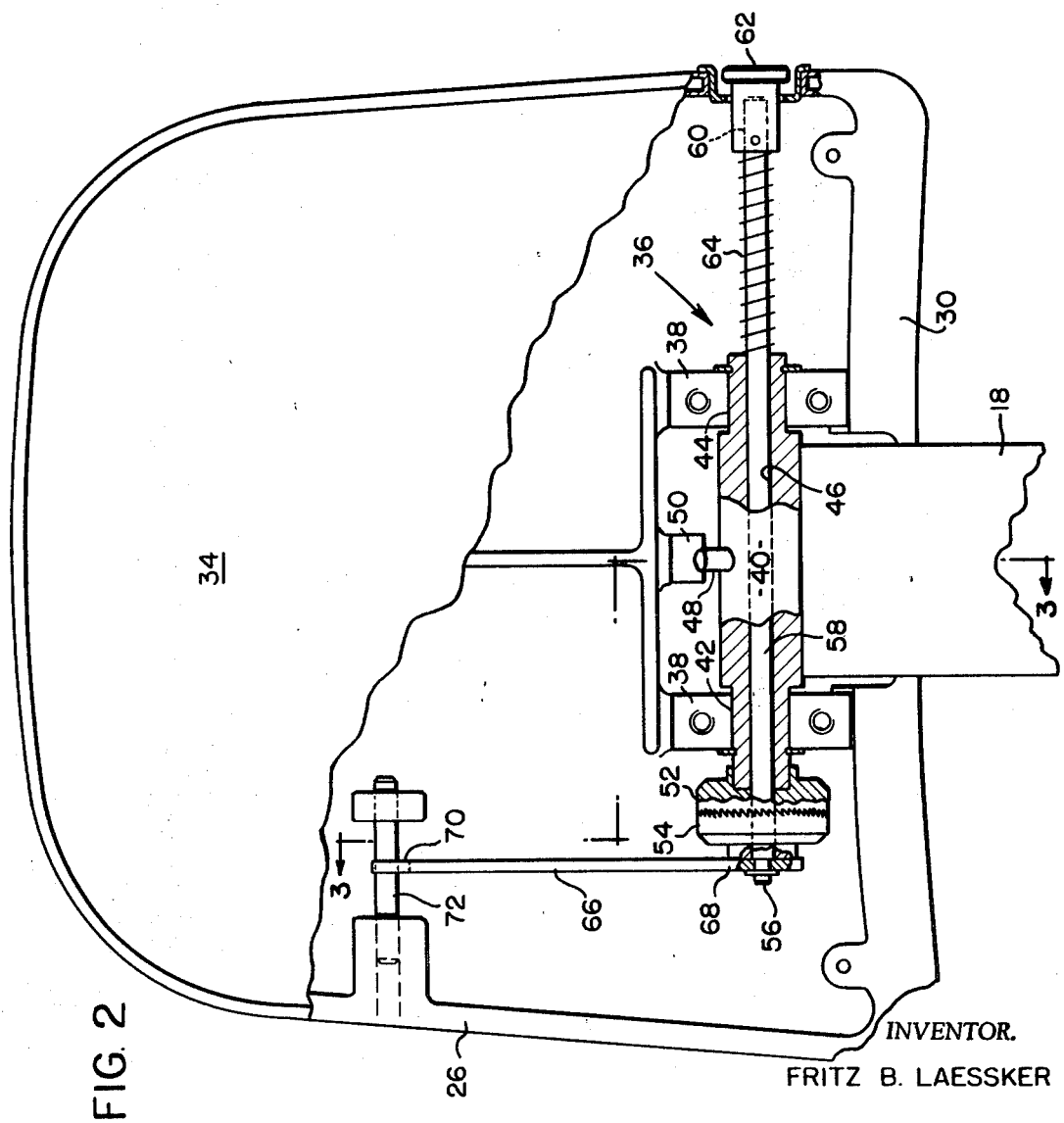
FIG. 2 is the rear-side elevation of the headrest partly broken away and in section to show the locking mechanism of the present invention.

The headrest includes a frame 26 having a sidewall 28 and a lower wall 30. This frame, together with upholstery material 32 carried on the front surface of the headrest for cushioning the patient's head and a rear panel member 34, forms a closed compartment which contains the headrest-locking mechanism generally indicated at 36 (FIG. 2). In order to preserve the slim profile of the headrest, it is preferred that the greatest thickness of the headrest, including the upholstery material should not exceed approximately 3 inches.

Referring to FIG. 2, rear panel 34 is shown broken away in order to expose the internal components of the headrest and, in particular, locking mechanism 36. These components include a pair of space bearings 38 fixed to frame 26. Extending between and journaled to each bearing 38 is one end 40 of slide member 18. For this purpose, end 40 is rounded and has axial projecting shaft portions 42 and 44 journaled to the bearing members 38. An axial bore 46 extends through the rounded end 40 and shaft portions 42,44 for purposes set out hereinbelow.

Figure 3:
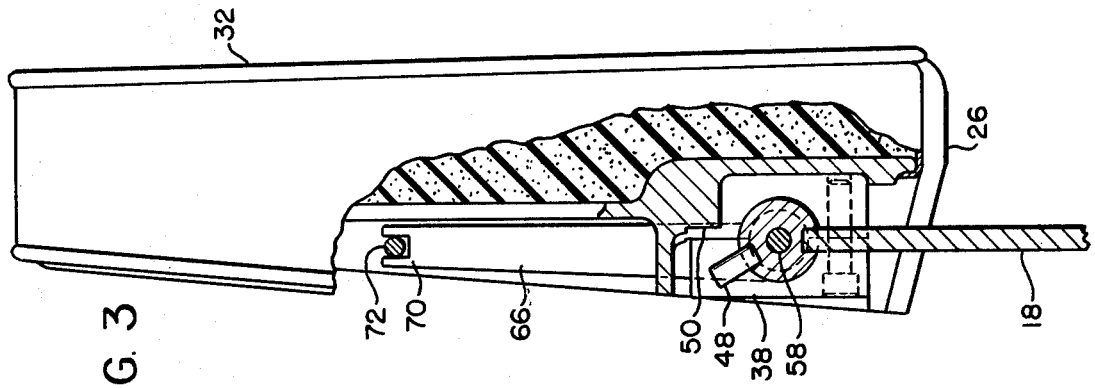
FIG. 3 is a view taken along lines 3—3 of FIG. 2.

With slide member 18 fixed to backrest 14, end 40 together with shaft portions 42,44 form the support about which bearings 38 and therefore frame 26 rotate. The limit for clockwise rotation or tilt of headrest 16 as viewed in FIG. 1 is determined by the engagement of slide member 18 with the lower wall 30 of the frame (FIG. 3). The counterclockwise or rearward tilt of headrest 16, as viewed in FIG. 1 is determined by the engagement of a radial tab 48 on end 40 with a stop 50 fixed to the frame (FIG. 3).

In order to lock headrest 16 in the desired position, one element of locking mechanism 36 is fixed to slide member 18 and one element is fixed to the headrest. In this respect, FIG. 2 shows that shaft portion 42 extends through its bearing support 38 and carries a toothed clutch member 52. Opposing clutch member 52 is a second toothed clutch member 54 fixed to frame 26 and adapted to move axially for engagement and disengagement with clutch member 52. The second toothed clutch member 54 is mounted on one end 56 of a shaft 58 which extends slidably through bore 46. The other end 60 of the shaft extends through the headrest sidewall 28 and is provided with any suitable operating means such as a button member 62 which can be pushed for operating the mechanism and manner set out hereinbelow.

A coil spring 64 disposed about shaft 58 is biased between one bearing member 38 and shaft end 60 for normally urging the shaft in a direction to engage the toothed clutch members 52,54. With this arrangement, pushing button 62 and moving the shaft against the spring biased will disengage the toothed clutch members to permit adjustment of the headrest.

While clutch member 54 and shaft 58 must move axially in order to engage and disengage the clutch members, at least clutch member 54 and preferably both the clutch member and shaft 58 must be fixed to the headrest frame in order to permit the engaged clutch members to lock the headrest in the desired inclined position. For this purpose, a lever arm 66 connects clutch member 54 to the frame with one end 68 of the lever arm being fixed to clutch member 54 and one end 70 being connected to an outrigger pin 72. Pin 72 is fixed to the headrest frame 26 with its axis generally parallel to the axis of shaft 58. The connection between lever arm end 70 and pin 72 is a sliding connecting as shown in FIG. 3 which permits the lever arm to move axially along the pin when clutch member 54 is axially moved with respect to clutch member 52. This sliding connection, however, pins the lever arm to frame 26 so that when clutch members 52,54 are disengaged, the lever arm and clutch member 54 will rotate with the frame as the frame is rotated on journals 38 about shaft portions 42,44 but will prevent rotation and lock the headrest in position when the clutch members are engaged.

Lever arm 66 and the rigid connection of its end 68 to clutch member 54 and the slidable connection of its end 70 to pin 72 greatly reduces the cost of construction, facilitates operation of the locking mechanism and increases the stability of the headrest.

In this respect, cost of manufacture is reduced because fixing clutch member 54 to frame 26 outrigger fashion with lever arm 66 and pin 72 eliminates the need for maintaining close tolerances in the location and parallelism between the pin axis and the axis of shaft 58. The tolerances at the connection between pin 72 and lever arm end 70 are also not critical as any motion due to play between these two elements can be reduced by a factor proportionate to the length of the lever arm. This in turn increases the stability of the headrest by reducing the tendency of the headrest to rock due to play between clutch member 54 and the pin slidably fixing the clutch member to the frame.

By way of describing the operation of the headrest, pushbutton 62 is depressed to disengage the clutch members in order to permit the headrest to be positioned at any desired angle within its limits of movement. Depressing the pushbutton 62 moves shaft 58 and clutch member 54 axially with respect to clutch member 52 and slides lever arm 66 on its outrigger pin 72. With the clutch members disengaged, the headrest can be titled and set to the desired angle. Pushbutton 62 then is released allowing spring bias 64 to return the shaft to reengage clutch members 52 and 54 lock the headrest at the set position.

Thus, it should be appreciated that the present invention accomplishes its intended objects, providing a slim-lined articulating headrest wherein the locking mechanism, wholly contained within the headrest, may be operated with a minimum of effort and securely locks the headrest at the set position.

Having thus described the invention in detail, what is claimed as new is:

1. An articulated headrest for dental chairs and the like comprising:
   a. a support member adapted for attachment to a dental chair;
   b. a headrest frame journaled to said support member;
   c. a pair of axially aligned toothed clutch members within said headrest frame, a first of said clutch members fixed to said support member and coaxial with said journal, and a second clutch member fixed to said headrest frame and being axially movable for engagement and disengagement with said first clutch member;
   d. a pin fixed to said headrest frame, said pin having the axis thereof generally parallel with the axis of said second clutch member;
   e. a lever arm having a first end fixed to said second clutch member and a second end slidably engaging said pin, said lever arm and pin comprising means for fixing said second clutch member to said frame;
   f. bias means within said headrest frame normally urging said clutch members into engagement for locking said headrest frame against movement about said journal; and
   g. drive means within said headrest frame connected to said second clutch member for axially moving said second clutch member against said bias means to disengage said clutch members and permit articulation of said headrest frame with respect to said support member.

2. An articulated headrest as set forth in claim 1 wherein said drive means comprises:
   a. a shaft within said headrest frame, said shaft being axially movable with respect to said support member and headrest frame and extending slidably through said journal;
   b. said second clutch member being fixed to one end of said shaft;
   c. said shaft having its second and extending through one side of said headrest frame; and
   d. a pushbutton on said second shaft end wherein pushing said pushbutton moves said shaft axially with respect to said headrest frame and against said bias to disengage said clutch members.

3. An articulated headrest for dental chairs and the like comprising:
   a. a frame having a headrest portion;
   b. a headrest support member having one end adapted for attachment to a dental chair and a second end extending into and journaled to said frame;
   c. a first toothed clutch member within said frame fixed to said support member coaxial with said journal;
   d. a second toothed clutch member within said frame fixed to rotate with said frame, said second toothed clutch member being axially movable toward and away from said first clutch member for engaging and disengaging said clutch members;
   e. means for driving said second toothed clutch member in corotation with said frame including a lever arm having one end fixed to said second toothed clutch member and a second end extending generally radially outward from said second clutch member and slidably fixed to said frame for movement along an axis generally parallel with the axis of said second clutch member;

f. bias means axially urging said toothed clutch members into engagement for locking said frame against rotation about said journal; and g. means for moving said second toothed clutch member axially against said bias means to disengage said clutch members and permit rotation of said frame about said journal.

4. An articulated headrest as set forth in claim 3 wherein said lever arm has its second end slidably engaging a pin fixed to said frame, said pin having its axis generally parallel to and offset from the axis of said second clutch member.

5. An articulated headrest as set forth in claim 3 wherein said second toothed clutch member is fixed to one end of a shaft, said shaft slidably extending coaxially through said journal with the second end of said shaft extending outwardly through one side of said frame said shaft being movable with respect to said frame and headrest support axially through said journal wherein pushing on said second end moves said shaft axially with respect to said frame and headrest support and against said bias means to disengage said clutch members.